(12) United States Patent
Ota

(10) Patent No.: US 10,033,414 B2
(45) Date of Patent: Jul. 24, 2018

(54) DISTORTION COMPENSATION DEVICE AND DISTORTION COMPENSATION METHOD

(71) Applicant: FUJITSU LIMITED, Kawasaki-shi, Kanagawa (JP)

(72) Inventor: Tomoya Ota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/426,655

(22) Filed: Feb. 7, 2017

(65) Prior Publication Data

US 2017/0288708 A1    Oct. 5, 2017

(30) Foreign Application Priority Data

Mar. 30, 2016    (JP) .................................. 2016-069391

(51) Int. Cl.
*H04B 1/04*    (2006.01)

(52) U.S. Cl.
CPC ... *H04B 1/0475* (2013.01); *H04B 2001/0425* (2013.01)

(58) Field of Classification Search
CPC .................................................... H04B 1/0475
USPC ........................................................ 455/114.3
See application file for complete search history.

(56) References Cited

U.S. PATENT DOCUMENTS

| 8,948,325 | B1* | 2/2015 | Warner | H04B 1/0475 375/297 |
| 2014/0362949 | A1* | 12/2014 | Pratt | H04B 1/0475 375/296 |
| 2015/0236655 | A1 | 8/2015 | Hirose et al. | |

FOREIGN PATENT DOCUMENTS

| JP | 2002-084146 A | 3/2002 |
| JP | 2005-065211 A | 3/2005 |
| JP | 2012-227881 A | 11/2012 |
| JP | 2014-003527 A | 1/2014 |
| JP | 5779725 B2 | 7/2015 |
| WO | WO 2014/050218 A1 | 4/2014 |

OTHER PUBLICATIONS

Bassam, et al, "2-D Digital Predistortion (2-D-DPD) Architecture for Concurrent Dual-Band Transmitters", IEEE Transactions on Microwave Theory and Techniques, vol. 59, No. 10, Oct. 2011.
Younes, et al, "On the Modeling and Linearization of a Concurrent Dual-Band Transmitter Exhibiting Nonlinear Distortion and Hardware Impairments", IEEE Transactions on Circuits and Systems-I: Regular Papers, vol. 60, No. 11, Nov. 2013.

* cited by examiner

*Primary Examiner* — Sanh Phu
(74) *Attorney, Agent, or Firm* — Arent Fox LLP

(57) ABSTRACT

A distortion compensation device includes: an odd-order distortion compensation unit that compensates an odd-order distortion occurring at first frequencies used for transmitting an amplified signal, the first frequencies including a plurality of frequencies; and an even-order distortion compensation unit that compensates an even-order distortion occurring at second frequencies different from the first frequencies due to the amplification of the signal, the second frequencies including one or more frequencies.

3 Claims, 6 Drawing Sheets

DISTORTION COMPENSATION DEVICE AND DISTORTION COMPENSATION METHOD

CROSS-REFERENCE TO RELATED APPLICATION(S)

This application is based upon and claims the benefit of priority of the prior Japanese Patent Application No. 2016-069391, filed on Mar. 30, 2016, the entire contents of which are incorporated herein by reference.

FIELD

The embodiments discussed herein are related to a distortion compensation device and a distortion compensation method.

BACKGROUND

In the field of wireless mobile communication, techniques have been proposed to compensate non-linear distortions of a power amplifier used at a base station or the like. According to one of the techniques, when signals in a plurality of frequency bands are concurrently amplified by a power amplifier used in common, non-linear distortions are compensated by using a plurality of distortion compensation units or a dual-band Digital Pre-Distortion (DPD) method. Further, known examples of a power amplifier employing the dual-band DPD method include a power amplifier having a Volterra filter of a dual-input truncated Volterra model provided at a stage preceding a two-dimensional Look-Up Table (LUT) so as to also compensate second order distortions. Other examples include a method configured to compensate harmonics or intermodulation distortions occurring in another band by inputting a signal having an inverse characteristic to a power amplifier and a method configured to compensate distortions by solving non-linear simultaneous equations.

Patent Document 1: Japanese Laid-open Patent Publication No. 2002-084146
Patent Document 2: Japanese Laid-open Patent Publication No. 2012-227881
Patent Document 3: Japanese Laid-open Patent Publication No. 2014-003527

Non-Patent Document

Non-Patent Document 1: Bassam, S. A., Helaoui, M., Ghannouchi, F. M. "2-D Digital Predistortion (2-D-DPD) Architecture for Concurrent Dual-Band Transmitters," IEEE Transactions on Microwave Theory and Techniques, vol. 59, no. 10, pp. 2547-2553, October 2011.
Non-Patent Document 2: Younes, M., Ghannouchi, F. M., "On the Modeling and Linearization of a Concurrent Dual-Band Transmitter Exhibiting Nonlinear Distortion and Hardware Impairments," IEEE Transactions on Circuits and Systems I, vol. 60, no. 11, pp. 3055-3068, November 2013.

However, according to the techniques described above, there are some situations where it is impossible to achieve a sufficient level of distortion compensation capability, which may lead to degradation of the quality of the wireless communication. For example, let us discuss a situation where signals in a plurality of frequency bands are concurrently amplified by a power amplifier used in common. In that situation, under the condition where the center frequencies of the two bands are in a relationship where one of the center frequencies is twice as high as the other (e.g., 4.6 GHz and 9 GHz), an even-number-order distortion (hereinafter, simply "even-order distortion") may occur at a frequency equal to the difference between the two center frequencies or at a frequency twice as high as the lower of the two center frequencies. When such an even-order distortion occurs at a frequency close to the band of the transmission signal, it is difficult to suppress the even-order distortion by using a filter. Further, for the purpose of suppressing the even-order distortion, a steep filer needs to be used, and the scale of the circuit in the device is prone to increase. In particular, when such an even-order distortion occurs within the band of the transmission signal, it is very difficult to suppress the even-order distortion by using a filter.

SUMMARY

According to an aspect of the embodiments, a distortion compensation device includes: an odd-order distortion compensation unit that compensates an odd-order distortion occurring at first frequencies used for transmitting an amplified signal, the first frequencies including a plurality of frequencies; and an even-order distortion compensation unit that compensates an even-order distortion occurring at second frequencies different from the first frequencies due to the amplification of the signal, the second frequencies including one or more frequencies.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The distortion compensation device and the distortion compensation method of the present disclosure are not be limited by the exemplary embodiments described below.

Figure 1:
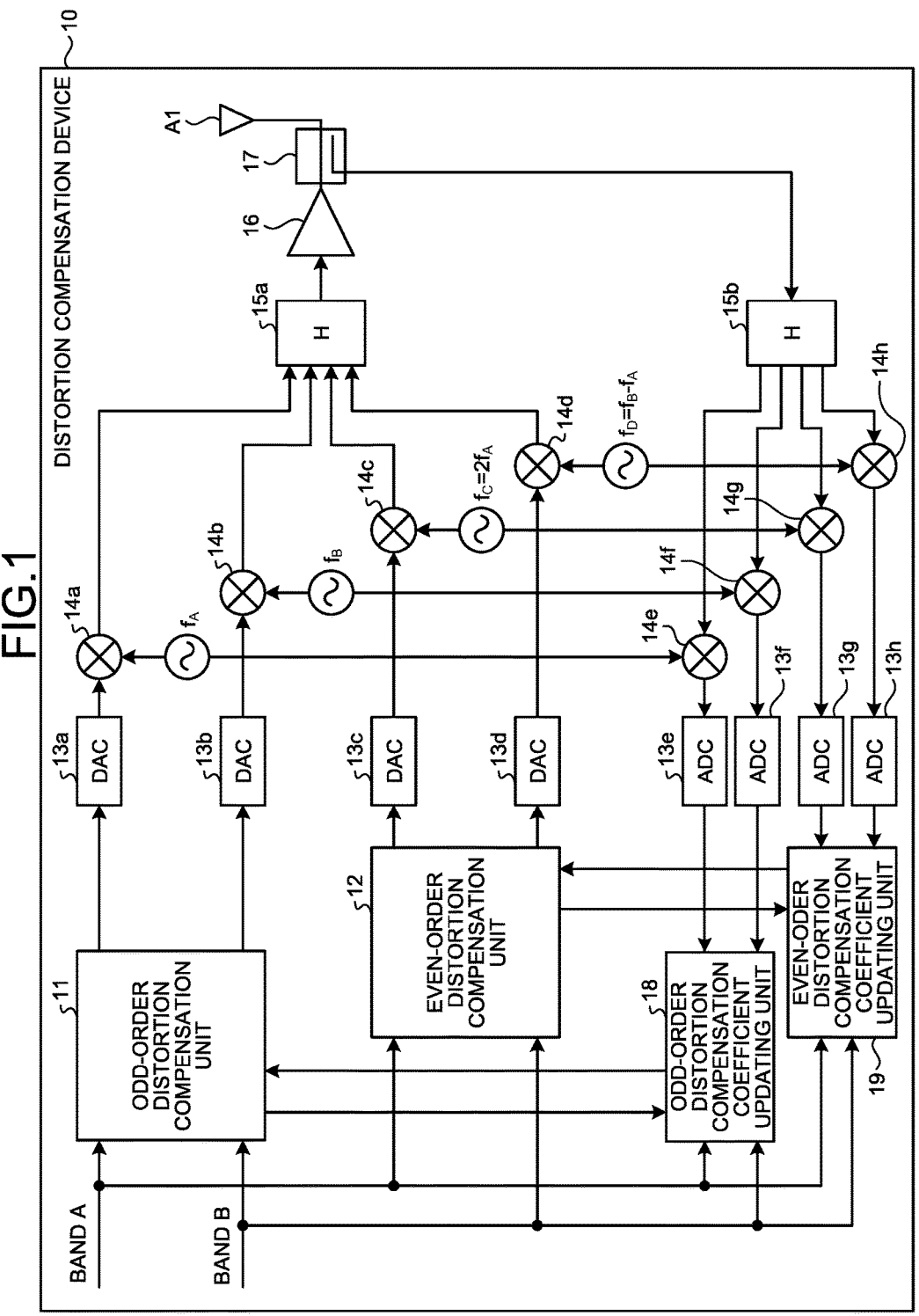
FIG. 1 is a diagram illustrating a configuration of a distortion compensation device according to an embodiment of the present disclosure.

FIG. 1 is a diagram illustrating a configuration of a distortion compensation device 10 according to an embodiment of the present disclosure. The distortion compensation device 10 is configured to amplify baseband signals (multi-band signals) in a plurality of frequency bands (e.g., 4.6 GHz and 9 GHz) by employing an amplifier used in common. As illustrated in FIG. 1, the distortion compensation device 10 includes an odd-number-order distortion compensation unit (hereinafter, "odd-order distortion compensation unit") 11, an even-number-order distortion compensation unit (hereinafter, "even-order distortion compensation unit") 12, Digital-to-Analog Converters (DACs) 13a to 13d, Analog-to-Digital Converters (ADCs) 13e to 13h, up-converters 14a to 14d, down-converters 14e to 14h, a signal combiner 15a, and a signal splitter 15b. Further, the distortion compensation device 10 also includes an amplifier 16, a coupler 17, an odd-order distortion compensation coefficient updating unit 18, and an even-order distortion compensation coefficient updating unit 19. These constituent elements are connected in such a manner that various types of signals and data can be input thereto and output therefrom either in one direction or in two directions.

In the following sections, an example will be explained in which dual-band signals in a band A (the center frequency $f_A$) and a band B (the center frequency $f_B$) are concurrently amplified by a power amplifier used in common ($f_A < f_B$). The odd-order distortion compensation unit 11 receives an input of two signals such as a transmission signal $x_A(n)$ in the band A and a transmission signal $x_B(n)$ in the band B and further generates an odd-order distortion compensation signal for the band A (the center frequency $f_A$) and an odd-order distortion compensation signal for the band B (the center frequency $f_B$) based on the input signals. Similarly, the even-order distortion compensation unit 12 receives an input of two signals such as a transmission signal $x_A(n)$ in the band A and a transmission signal $x_B(n)$ in the band B and further generates an even-order distortion compensation signal corresponding to a center frequency $f_C=2f_A$ and an even-order distortion compensation signal corresponding to a center frequency $f_D=f_B-f_A$, based on the input signals. Each of the DACs 13a and 13b converts a corresponding one of the odd-order distortion compensation signals input thereto from the odd-order distortion compensation unit 11, from the digital signal into an analog signal. Similarly, each of the DACs 13c and 13d converts a corresponding one of the even-order distortion compensation signals input thereto from the even-order distortion compensation unit 12, from the digital signal into an analog signal.

Each of the up-converters 14a to 14d generates a Radio Frequency (RF) signal by converting the frequency of the analog signal input thereto from a corresponding one of the DACs 13a to 13d, so that the signals have the frequencies $f_A$, $f_B$, $f_C=2f_A$, and $f_D=f_B-f_A$, respectively. The signal combiner 15a combines together the RF signals input thereto from the up-converters 14a to 14d. The amplifier 16 amplifies the power of the signal resulting from the combining process and being input thereto from the signal combiner 15a. The coupler 17 arranges the signal input thereto from the amplifier 16 to be distributed, so as to subsequently transmit one of the signals from an antenna A1 wirelessly and to feed back the other signal to the signal splitter 15b.

The signal splitter 15b splits the fed-back signal described above, as four signals. Each of the down-converters 14e to 14h converts the frequency of a corresponding one of the signals input thereto from the signal spliter 15b, from the frequencies $f_A$, $f_B$, $f_C=2f_A$, and $f_D=f_B-f_A$ to a baseband frequency. Each of the ADCs 13e to 13h converts a corresponding one of the analog signals input thereto from a corresponding one of the down-converters 14e to 14h, into a digital signal.

The odd-order distortion compensation coefficient updating unit 18 updates an odd-order distortion compensation coefficient based on the transmission signal $x_A(n)$ in the band A, the transmission signal $x_B(n)$ in the band B, the feedback signal for the band A (the center frequency $f_A$), the feedback signal for the band B (the center frequency $f_B$), and the pre-update distortion compensation coefficient. The odd-order distortion compensation coefficient updating unit 18 outputs the post-update odd-order distortion compensation coefficient to the odd-order distortion compensation unit 11. Similarly, the even-order distortion compensation coefficient updating unit 19 updates an even-order distortion compensation coefficient based on the transmission signal $x_A(n)$ in the band A, the transmission signal $x_B(n)$ in the band B, the feedback signal corresponding to the center frequency $f_C=2f_A$, the feedback signal corresponding to the center frequency $f_C=f_B-f_A$, and the pre-update distortion compensation coefficient. The even-order distortion compensation coefficient updating unit 19 outputs the post-update even-order distortion compensation coefficient to the even-order distortion compensation unit 12.

Figure 2:
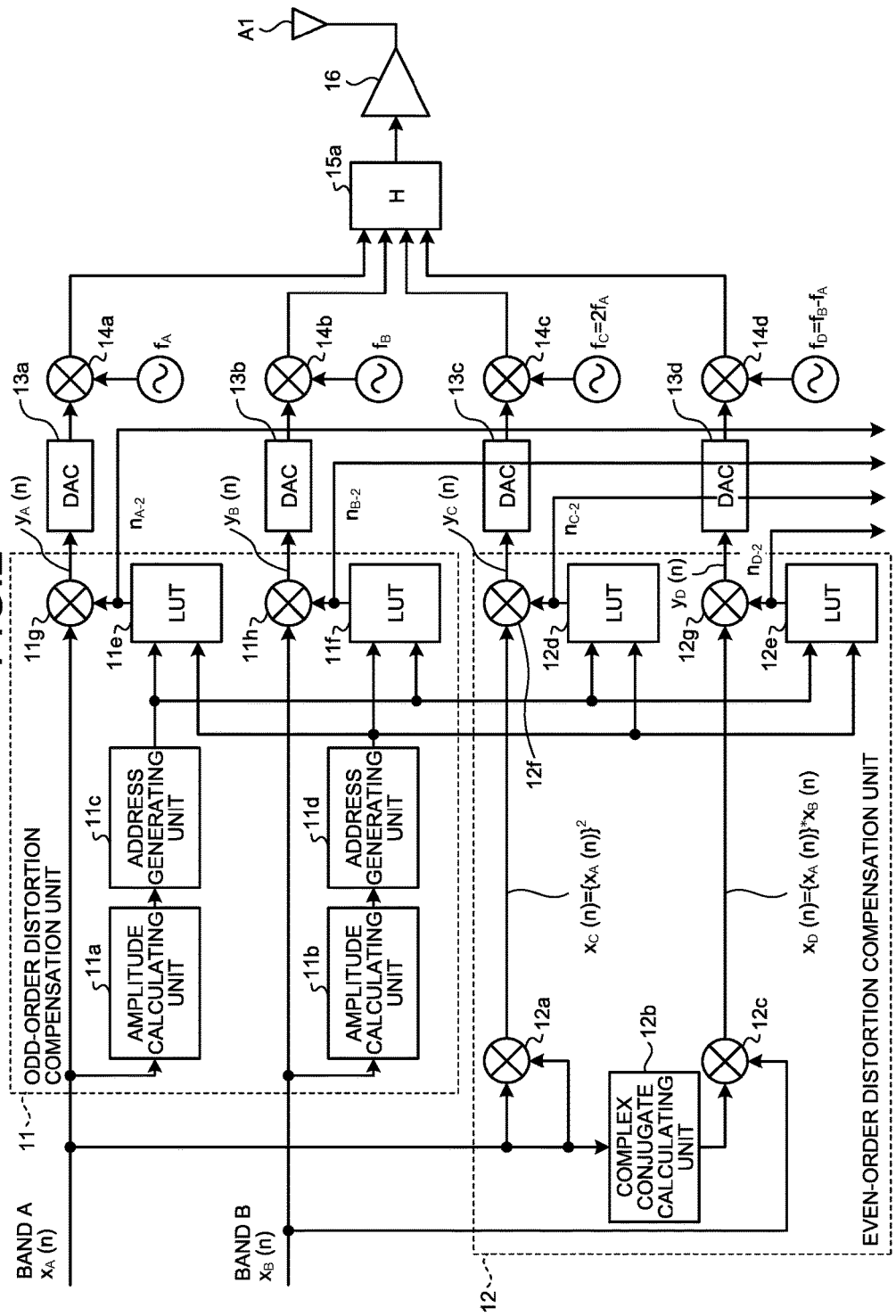
FIG. 2 is a diagram illustrating configurations of an odd-order distortion compensation unit and an even-order distortion compensation unit according to the present embodiment.

FIG. 2 is a diagram illustrating configurations of the odd-order distortion compensation unit 11 and the even-order distortion compensation unit 12 of the present embodiment. As illustrated in FIG. 2, the odd-order distortion compensation unit 11 includes amplitude calculating units 11a and 11b, address generating units 11c and 11d, Look-Up Tables (LUTs) 11e and 11f, and complex multipliers 11g and 11h. The even-order distortion compensation unit 12 includes a complex multiplier 12a, a complex conjugate calculating unit 12b, a complex multiplier 12c, LUTs 12d and 12e, and complex multipliers 12f and 12g. These constituent elements are connected in such a manner that various types of signals and data can be input thereto and output therefrom either in one direction or in two directions.

The amplitude calculating units 11a and 11b calculate the amplitude of the transmission signal $x_A(n)$ in the band A and the amplitude of the transmission signal $x_B(n)$ in the band B, respectively. The address generating units 11c and 11d convert information about the calculated amplitudes into addresses and output the two addresses to the four LUTs 11e, 11f, 12d, and 12e. Each of the LUTs 11e and 11f stores the distortion compensation coefficient into an updatable memory so as to be kept in correspondence with the addresses. Based on the two addresses described above, the complex multiplier 11g reads the odd-order distortion compensation coefficient for the band A from the LUT 11e for an odd-order distortion compensation process corresponding to the band A (the center frequency $f_A$) and further generates an odd-order distortion compensation signal $y_A(n)$ for the band A by performing a complex multiplication on the transmission signal $x_A(n)$ in the band A with the read odd-order distortion compensation coefficient. Based on the two addresses described above, the complex multiplier 11h reads the odd-order distortion compensation coefficient for the band B from the LUT 11f for an odd-order distortion compensation process corresponding to the band B (the center frequency $f_B$) and further generates an odd-order distortion compensation signal $y_B(n)$ for the band B by performing a complex multiplication on the transmission signal $x_B(n)$ in the band B with the read odd-order distortion compensation coefficient.

The complex multiplier 12a generates a signal $x_C(n)$ being a source of an even-order distortion corresponding to the center frequency $f_C=2f_A$ by squaring the transmission signal $x_A(n)$ in the band A. The complex conjugate calculating unit 12b calculates the complex conjugate of the transmission signal $x_A(n)$ in the band A. The complex multiplier 12c generates a signal $x_D(n)$ being a source of an even-order distortion corresponding to the center frequency $f_D=f_B-f_A$ by performing a complex multiplication on the calculated complex conjugate and the transmission signal $x_B(n)$ in the band B. Each of the LUTs 12d and 12e stores the distortion compensation coefficient into an updatable memory so as to be kept in correspondence with the addresses. Based on the two addresses described above, the complex multiplier 12f reads the even-order distortion compensation coefficient corresponding to the center frequency $f_C=2f_A$ from the LUT 12d for an even-order distortion compensation process corresponding to the center frequency $f_C=2f_A$ and further generates an even-order distortion compensation signal $y_C(n)$ corresponding to the center frequency $f_C=2f_A$ by performing a complex multiplication on the signal $x_C(n)$ being a source of the even-order distortion corresponding to the center frequency $f_C=2f_A$ with the read even-order distortion compensation coefficient. Based on the two addresses described above, the complex multiplier 12g reads the even-order distortion compensation coefficient corresponding to the center frequency $f_D=f_B-f_A$ from the LUT 12e for an even-order distortion compensation process corresponding to the center frequency $f_D=f_B-f_A$ and further generates an even-order distortion compensation signal $y_D(n)$ corresponding to the center frequency $f_D=f_B-f_A$ by performing a complex multiplication on the signal $x_D(n)$ being a source of an even-order distortion corresponding to the center frequency $f_D=f_B-f_A$.

Figure 3:
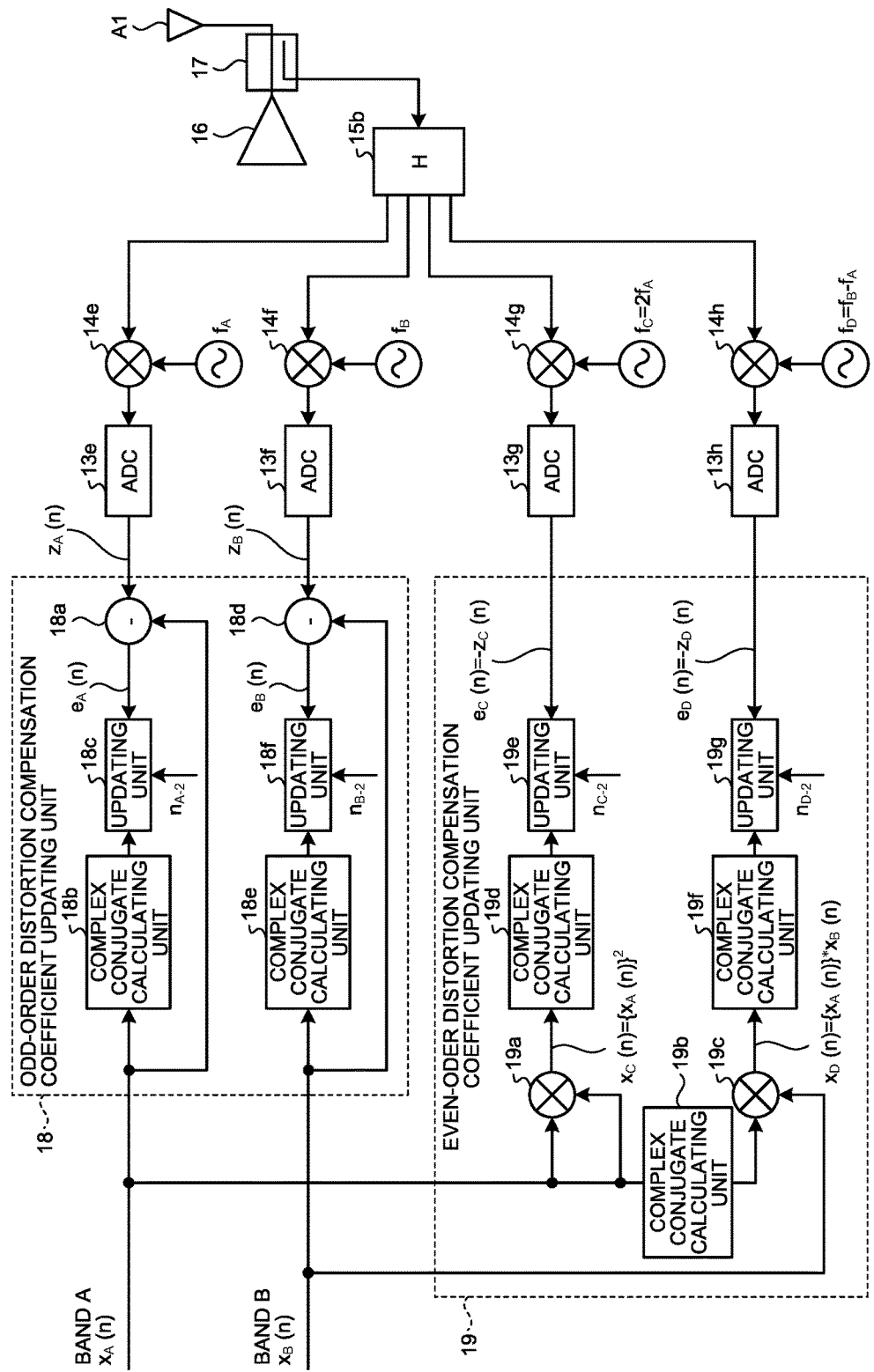
FIG. 3 is a diagram illustrating configurations of an odd-order distortion compensation coefficient updating unit and an even-order distortion compensation coefficient updating unit according to the present embodiment.

FIG. 3 is a diagram illustrating configurations of the odd-order distortion compensation coefficient updating unit 18 and the even-order distortion compensation coefficient updating unit 19 according to the present embodiment. As illustrated in FIG. 3, the odd-order distortion compensation coefficient updating unit 18 includes a subtractor 18a, a complex conjugate calculating unit 18b, an updating unit 18c, a subtractor 18d, a complex conjugate calculating unit 18e, and an updating unit 18f. The even-order distortion compensation coefficient updating unit 19 includes a complex multiplier 19a, a complex conjugate calculating unit 19b, a complex multiplier 19c, a complex conjugate calculating unit 19d, an updating unit 19e, a complex conjugate calculating unit 19f, and an updating unit 19g. These constituent elements are connected in such a manner that various types of signals and data can be input thereto and output therefrom either in one direction or in two directions.

The subtractor 18a calculates an error between a feedback signal $z_A(n)$ for the band A (the center frequency $f_A$) and the transmission signal $x_A(n)$ in the band A and obtains an error signal for the band A expressed as $e_A(n)=x_A(n)-z_A(n)$. The complex conjugate calculating unit 18b calculates the complex conjugate of the transmission signal $x_A(n)$ in the band A. The updating unit 18c updates the odd-order distortion compensation coefficient for the band A to be $w_A(|x_A(n)|, |x_B(n)|)$, by using the error signal $e_A(n)$, the abovementioned complex conjugate, and the pre-update odd-order distortion compensation coefficient for the band A obtained from the LUT 11e ($n_{A-2}$). The value of the post-update odd-order distortion compensation coefficient is stored into the LUT 11e.

Similarly, the subtractor 18d calculates an error between a feedback signal $z_B(n)$ for the band B (the center frequency $f_B$) and the transmission signal $x_B(n)$ in the band B and obtains an error signal for the band B expressed as $e_B(n)=x_B(n)-z_B(n)$. The complex conjugate calculating unit 18e calculates the complex conjugate of the transmission signal $x_B(n)$ in the band B. The updating unit 18f updates the odd-order distortion compensation coefficient for the band B to be $w_B(|x_A(n)|, |x_B(n)|)$, by using the error signal $e_B(n)$, the abovementioned complex conjugate, and the pre-update odd-order distortion compensation coefficient for the band B obtained from the LUT 11f ($n_{B-2}$). The value of the post-update odd-order distortion compensation coefficient is stored into the LUT 11f.

The complex multiplier 19a generates a signal $x_C(n)=\{x_A(n)\}^2$ being a source of an even-order distortion corresponding to the center frequency $f_C=2f_A$ by squaring the transmission signal $x_A(n)$ in the band A. The complex conjugate calculating unit 19b calculates the complex conjugate of the transmission signal $x_A(n)$ in the band A. The complex multiplier 19c generates a signal $x_C(n)=\{x_A(n)\}^**x_B(n)$ being a source of an even-order distortion corresponding to the center frequency $f_D=f_B-f_A$ by performing a complex multiplication on the abovementioned complex conjugate and the transmission signal $x_B(n)$ in the band B.

The complex conjugate calculating unit 19d calculates the complex conjugate of the signal $x_C(n)$ being a source of an even-order distortion corresponding to the center frequency $f_C=2f_A$. The updating unit 19e updates the even-order distortion compensation coefficient corresponding to the center frequency $f_C=2f_A$ to be $w_C(|x_A(n)|, |x_B(n)|)$, by using an error signal $e_C(n)$ for an even-order distortion corresponding to the center frequency $f_C=2f_A$, the abovementioned complex conjugate, and the pre-update even-order distortion compensation coefficient that corresponds to the center frequency $f_C=2f_A$ and is obtained from the LUT 12d ($n_{C-2}$). The value of the post-update even-order distortion compensation coefficient is stored into the LUT 12d. In this situation, the error signal $e_C(n)$ is a signal indicating the error between the feedback signal $z_C(n)$ for an even-order distortion corresponding to the center frequency $f_C=2f_A$ and a zero signal. In the present embodiment, the error signal $e_C(n)=-z_C(n)$ is satisfied.

Similarly, the complex conjugate calculating unit 19f calculates the complex conjugate of the signal $x_C(n)$ being a source of an even-order distortion corresponding to the center frequency $f_D=f_B-f_A$. The updating unit 19g updates the even-order distortion compensation coefficient corresponding to the center frequency $f_D=f_B-f_A$ to be $w_D(|x_A(n)|, |x_B(n)|)$, by using an error signal $e_D(n)$ for an even-order distortion corresponding to the center frequency $f_D=f_B-f_A$, the abovementioned complex conjugate, and the pre-update even-order distortion compensation coefficient that corresponds to the center frequency $f_D=f_B-f_A$ and is obtained from the LUT 12e ($n_{D-2}$). The value of the post-update even-order distortion compensation coefficient is stored into the LUT 12e. In this situation, the error signal $e_D(n)$ is a signal indicating the error between the feedback signal $z_D(n)$ for an even-order distortion corresponding to the center frequency $f_D=f_B-f_A$ and a zero signal. In the present embodiment, the error signal $e_D(n)=-z_D(n)$ is satisfied.

In the following sections, the method for compensating the even-order distortion will be explained more specifically, by using an example in which the dual-band signals in the band A (the center frequency $f_A$) and the band B (the center frequency $f_B$) are concurrently amplified by a power amplifier used in common ($f_A < f_B$). As explained above, the distortion compensation device 10 is configured so as to include both the distortion compensation unit that compensates odd-order distortions and the distortion compensation unit that compensates even-order distortions when the signals are concurrently amplified by a power amplifier used in common. When compensating the odd-order distortions, the distortion compensation device 10 uses, for the band A, the transmission signal in the band A and the amplitude information of the bands A and B (and the post-update distortion compensation coefficient) and uses, for the band B, the transmission signal in the band B and the amplitude information of the bands A and B (and the post-update distortion compensation coefficient). In contrast, when compensating even-order distortions occurring at a center frequency $f_{even}$, the distortion compensation device 10 uses an even-order distortion signal (an even-order term) described below and the amplitude information of the bands A and B (and the post-update distortion compensation coefficient). In this situation, the amplitude information is used as the addresses to identify the distortion compensation coefficients from the LUTs 11e, 11f, 12d, and 12e.

When the center frequency $f_{even}$ of an even-order distortion satisfies $f_{even} = a \times f_A + b \times f_B$ (where a and b are each an integer; and "a+b" equals to an even number), it is possible to express the abovementioned even-order distortion signal (the even-order term) as indicated below, depending on the values of a and b. The symbol ^ denotes exponentiation.
1. When a≥0 and b≥0 are both satisfied:
(The transmission signal in the band A)^|a|×(The transmission signal in the band B)^|b|
2. When a≥0 and b≤0 are both satisfied:
(The transmission signal in the band A)^|a|×(The complex conjugate of the transmission signal in the band B)^|b|
3. When a<0 and b≥0 are both satisfied:
(The complex conjugate of the transmission signal in the band A)^|a|×(The transmission signal in the band B)^|b|
4. When a<0 and b<0 are both satisfied:
(The complex conjugate of the transmission signal in the band A)^|a|×(The complex conjugate of the transmission signal in the band B)^|b|

Figure 4:
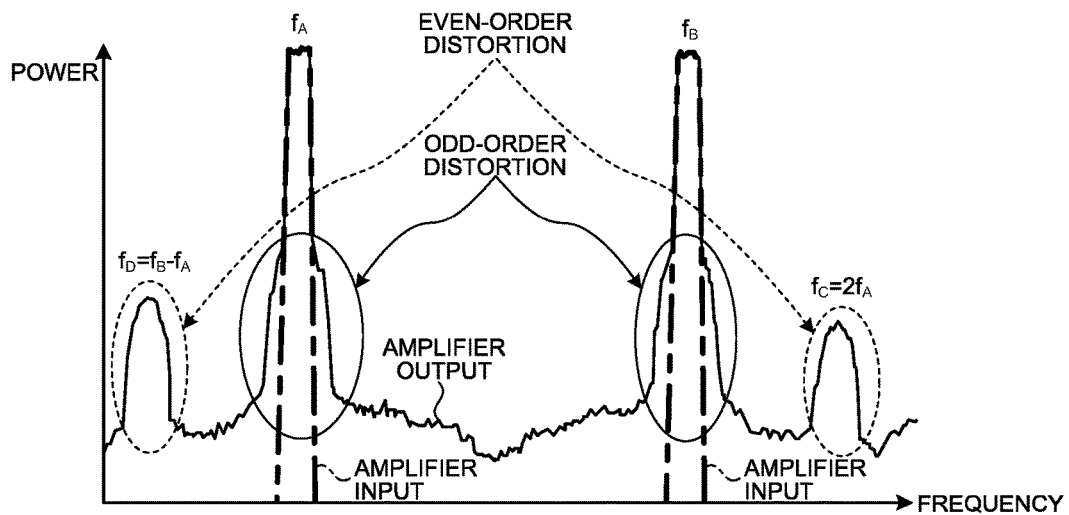
FIG. 4 is a chart illustrating a spectrum of an amplifier input and an amplifier output when signals in a plurality of frequency bands are concurrently amplified by a power amplifier used in common before distortion compensation process is applied.

FIG. 4 is a chart illustrating a spectrum of an amplifier input and an amplifier output when signals in a plurality of frequency bands are concurrently amplified by a power amplifier used in common before distortion compensation process is applied. In FIG. 4, the horizontal axis expresses the frequency, whereas the vertical axis expresses the power. As illustrated in FIG. 4, before distortion compensation process is applied, at the stage of an amplifier output, the amplifier input indicated with the bold line experiences distortions at the four frequencies, namely $f_A$ to $f_D$. In other words, because odd-order distortions occur at the center frequency $f_A$ (the band A) and the center frequency $f_B$ (the band B), the power leakage to the adjacent channels increases. Further, because even-order distortions occur at the center frequency $f_C=2f_A$ (a=2, b=0) and the center frequency $f_D=f_B-f_A$ (a=-1, b=1), the power leakage to the frequencies $f_C$ and $f_D$ increases.

Accordingly, for example, because a≥0 and b≥0 are both satisfied at the center frequency $f_C=2f_A$ (a=2, b=0), the even-order distortion signal (the even-order term) is expressed as $\{x_A(n)\}^2$, based on (The transmission signal in the band A)^|a|×(The transmission signal in the band B)^|b|. Further, for example, because a<0 and b≥0 are both satisfied at the center frequency $f_D=f_B-f_A$ (a=-1, b=1), the even-order distortion signal (the even-order term) is expressed as $\{x_A(n)\}^* x_B(n)$, based on (The complex conjugate of the transmission signal in the band A)^|a|×(The transmission signal in the band B)^|b|.

As a result, it is possible to express the signals $y_A(n)$, $y_B(n)$, $y_C(n)$, and $y_D(n)$ resulting from the distortion compensation process by using Expressions (1) to (4) presented below (where $w_A$, $w_B$, $w_C$, and $w_D$ each denote a distortion compensation coefficient).

Mathematical Formula 1

$$y_A(n)=w_A(|x_A(n)|,|x_B(n)|)x_A(n) \quad (1)$$

$$y_B(n)=w_B(|x_A(n)|,|x_B(n)|)x_B(n) \quad (2)$$

$$y_C(n)=w_C(|x_A(n)|,|x_B(n)|)x_C(n)=w_C(|x_A(n)|,|x_B(n)|)\{x_A(n)\}^2 \quad (3)$$

$$y_D(n)=w_D(|x_A(n)|,|x_B(n)|)x_D(n)=w_D(|x_A(n)|,|x_B(n)|)\{x_A(n)\}^* x_B \quad (4)$$

Further, when a direct learning method is used, the odd-order distortion compensation unit 11 updates the odd-order distortion compensation coefficients as indicated in Expressions (5) and (6) presented below. Similarly, when a direct learning method is used, the even-order distortion compensation unit 12 updates the even-order distortion compensation coefficients as indicated in Expressions (7) and (8) presented below.

Mathematical Formula 2

$$w_A(|x_A(n+1)|,|x_B(n+1)|)=w_A(|x_A(n)|,|x_B(n)|)+\mu \times e_A(n)\{x_A(n)\}^* \quad (5)$$

$$w_B(|x_A(n+1)|,|x_B(n+1)|)=w_B(|x_A(n)|,|x_B(n)|)+\mu \times e_B(n)\{x_B(n)\}^* \quad (6)$$

$$w_C(|x_A(n+1)|,|x_B(n+1)|)=w_C(|x_A(n)|,|x_B(n)|)+\mu \times e_C(n)\{x_C(n)\}^* \quad (7)$$

$$w_D(|x_A(n+1)|,|x_B(n+1)|)=w_D(|x_A(n)|,|x_B(n)|)+\mu \times e_D(n)\{x_D(n)\}^* \quad (8)$$

Further, it is possible to express the error signals $e_A(n)$, $e_B(n)$, $e_C(n)$, and $e_D(n)$ by using Expressions (9) to (12) presented below (where $z_A(n)$, $z_B(n)$, $z_C(n)$, and $z_D(n)$ each denote a feedback signal).

Mathematical Formula 3

$$e_A(n)=x_A(n)-z_A(n) \quad (9)$$

$$e_B(n)=x_B(n)-z_B(n) \quad (10)$$

$$e_C(n)=0-z_C(n)=-z_C(n) \quad (11)$$

$$e_D(n)=0-z_D(n)=-z_D(n) \quad (12)$$

Figure 5:
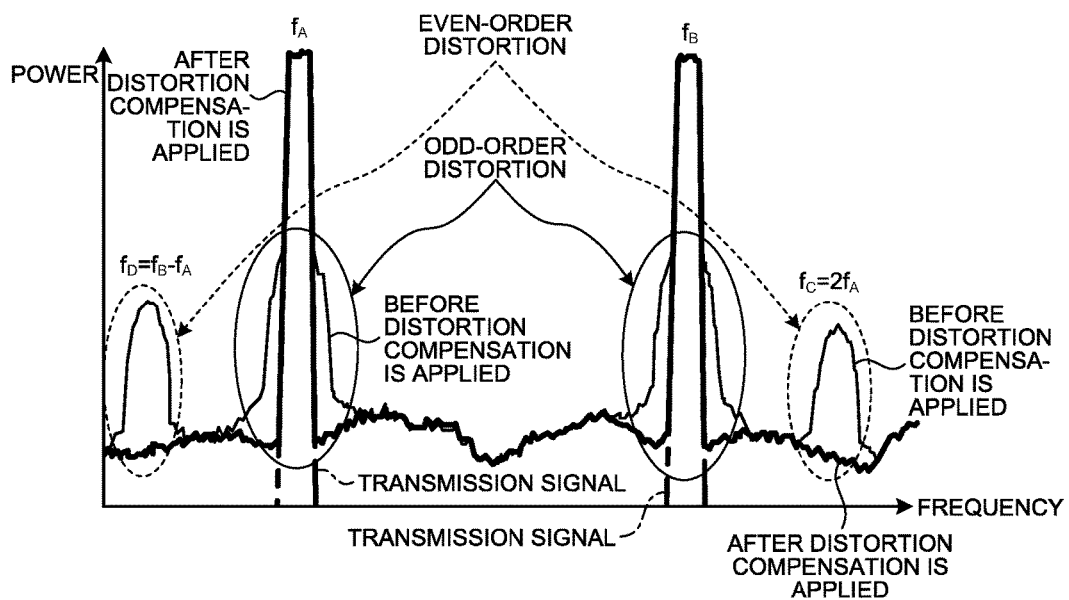
FIG. 5 is a chart illustrating a spectrum for explaining advantageous effects of a distortion compensation process according to the present embodiment.

FIG. 5 is a chart illustrating a spectrum for explaining advantageous effects of the distortion compensation process according to the present embodiment. In FIG. 5, the horizontal axis expresses the frequency, whereas the vertical axis expresses the power. As illustrated in FIG. 5, before distortion compensation process is applied, odd-order distortions occur at the center frequency $f_A$ (the band A) and the center frequency $f_B$ (the band), and even-order distortions occur at the center frequency $f_C$ and the center frequency $f_D$. As a result of applying the distortion compensation technique according to the present embodiment, the spectrum changes as indicated with the bold line. In other words, in addition to compensating the odd-order distortions, it is also possible to compensate the even-order distortions with a high level of precision.

As explained above, the distortion compensation device 10 includes the odd-order distortion compensation unit 11 and the even-order distortion compensation unit 12. The odd-order distortion compensation unit 11 compensates the odd-order distortions occurring at first frequencies used for transmitting the amplified signal, the first frequencies including a plurality of frequencies. The even-order distortion compensation unit 12 compensates the even-order distortions occurring at a second frequency different from the first frequencies due to the amplification of the signal, the second frequency including one or more frequencies. More specifically, when signals are amplified and transmitted, the odd-order distortion compensation unit 11 compensates the odd-order distortions occurring at the first and the second frequencies (e.g., $f_A$ and $f_B$) that are used for transmitting the signals and are in the vicinity of the signals. The even-order distortion compensation unit 12 compensates the even-order distortions occurring at third and fourth frequencies (e.g., $f_C=2f_A$ and $f_D=f_B-f_A$) due to the amplification of the signals.

In the distortion compensation device 10, the odd-order distortion compensation unit 11 may generate the signal resulting from the odd-order distortion compensation process by using, for the first frequencies, the transmission signal at a corresponding frequency and the odd-order distortion compensation coefficient for the corresponding frequency. The even-order distortion compensation unit 12 may generate the signal resulting from the even-order distortion compensation process by using, for the second frequency, the transmission signal at one of the first frequencies and the even-order distortion compensation coefficient for the second frequency. More specifically, in the distortion compensation device 10, for each of the first and the second frequencies, the odd-order distortion compensation unit 11 may generate the signal resulting from the odd-order distortion compensation process (e.g., $y_A(n)$, $y_B(n)$) by using the transmission signal at a corresponding frequency (e.g., $x_A(n)$ in Expression (1) or $x_B(n)$ in Expression (2)) and the odd-order distortion compensation coefficient for the corresponding frequency (e.g., $w_A(|x_A(n)|,|x_B(n)|)$ or $w_B(|x_A(n)|,|x_B(n)|)$). Further, for each of the third and the fourth frequencies, the even-order distortion compensation unit 12 may generate the signal resulting from the even-order distortion compensation process (e.g., $y_C(n)$, $y_D(n)$) by using the transmission signal at at least one of the first frequencies (e.g., $\{x_A(n)\}^2$ in Expression (3) or $\{x_A(n)\}^*$ in Expression (4)) and the even-order distortion compensation coefficient for the corresponding frequency (e.g., $w_C(|x_A(n)|,|x_B(n)|)$ or $w_C(|x_A(n)|,|x_B(n)|)$).

In the distortion compensation device 10, when the second frequency is twice as high as at least one of the first frequencies, the even-order distortion compensation unit 12 may generate the signal resulting from the even-order distortion compensation process, by using a value obtained by squaring the transmission signal at the at least one of the first frequencies and the even-order distortion compensation coefficient for the second frequency. Further, when the second frequency is equal to the difference between at least two of the plurality of frequencies included in the first frequencies, the even-order distortion compensation unit 12 may generate the signal resulting from the even-order distortion compensation process by using the complex conjugate of the transmission signal at at least one of the first frequencies, the transmission signal at the at least one of the first frequencies, and the even-order distortion compensation coefficient for the second frequency. More specifically, in the distortion compensation device 10, when the third frequency is twice as high as at least one of the first frequencies (e.g., $f_C=2f_A$), the even-order distortion compensation unit 12 may generate the signal resulting from the even-order distortion compensation process obtained by compensating a distortion occurring at the third frequency, by using a value obtained by squaring the transmission signal at the least one of the first frequencies (e.g., $\{x_A(n)\}^2$ in Expression (3)) and the even-order distortion compensation coefficient for the third frequency (e.g., $w_C(|x_A(n)|,|x_B(n)|)$). Further, when the fourth frequency is equal to the difference between the second frequency and at least one of the first frequencies (e.g., $f_D=f_B-f_A$), the even-order distortion compensation unit 12 may generate the signal resulting from the even-order distortion compensation process obtained by compensating a distortion occurring at the fourth frequency, by using the complex conjugate of the transmission signal at the at least one of the first frequencies (e.g., $\{x_A(n)\}^*$ in Expression (4)), the transmission signal at the second frequency (e.g., $x_B(n)$), and the even-order distortion compensation coefficient for the fourth frequency (e.g., $w_D(|x_A(n)|,|x_B(n)|)$).

The distortion compensation device 10 may further include the odd-order distortion compensation coefficient updating unit 18 that updates the odd-order distortion compensation coefficient by using, for the first frequencies, an error signal indicating the difference between a transmission signal at a corresponding frequency and the feedback signal and the complex conjugate of the transmission signal at the corresponding frequency. Further, the distortion compensation device 10 may further include the even-order distortion compensation coefficient updating unit 19 that updates the even-order distortion compensation coefficient by using, for the second frequency, an error signal indicating the difference between a zero signal and the feedback signal and the complex conjugate of the signal being a source of an even-order distortion at a corresponding frequency. More specifically, the distortion compensation device 10 may further include the odd-order distortion compensation coefficient updating unit 18 that updates the odd-order distortion compensation coefficient by using, for each of the first and the second frequencies, the error signal (e.g., $e_A(n)$ or $e_B(n)$) indicating the difference between the transmission signal at a corresponding frequency and the feedback signal (e.g., $z_A(n)$ or $z_B(n)$) and the complex conjugate (e.g., $\{x_A(n)\}^*$ or $\{x_B(n)\}^*$) of the transmission signal at the corresponding frequency. Further, the distortion compensation device 10 may further include the even-order distortion compensation coefficient updating unit 19 that updates the even-order distortion compensation coefficient by using, for each of the third and the fourth frequencies, the error signal (e.g., $e_C(n)$ or $e_C(n)$) indicating the difference between a zero signal and the feedback signal (e.g., $z_C(n)$ or $z_C(n)$) and the complex conjugate (e.g., $\{x_C(n)\}^*$ or $\{x_D(n)\}^*$) of a signal being a source of an even-order distortion at a corresponding frequency.

[a] First Modification Example

In the embodiment described above, the example of a LUT-type distortion compensation process using the LUTs is explained; however, it is also acceptable to use a power-series-type distortion compensation process. When performing the power-series-type distortion compensation process, the distortion compensation device 10 implements a distortion compensation method by which an inverse characteristic of a non-linear distortion of a Power Amplifier (PA) is approximated with the use of a "power series" so that a distortion compensation process is performed by using the power series. More specifically, the distortion compensation device 10 generates a plurality of signals having a higher order with respect to baseband signals input thereto, multiplies each of the signals having the higher order by a distortion compensation coefficient prepared for each of various order values, and generates a distortion compensation signal by combining all the signals together resulting from the multiplications using the distortion compensation coefficients.

[b] Second Modification Example

In the embodiment described above, as illustrated in FIGS. 1 to 3, the distortion compensation device 10 configures each of the up-converters 14a to 14d and the down-converters 14e to 14h by using a local oscillator; however, possible embodiments are not limited to this example. The distortion compensation device 10 may be configured to generate local signals at the frequency $f_C=2f_A$ and the frequency $f_D=f_B-f_A$ that are input to the up-converters 14c and 14d through a mixing process that uses a mixer on local signals at the frequency $f_A$ and the frequency $f_B$. Similarly, the distortion compensation device 10 may be configured to generate local signals at the frequency $f_C=2f_A$ and the frequency $f_D=f_B-f_A$ that are input to the down-converters 14g and 14h through a mixing process that uses a mixer on local signals at the frequency $f_A$ and the frequency $f_B$. With this configuration, it is possible to reduce the quantity of the local oscillators being used (e.g., from four to two).

[c] Third Modification Example

In the embodiment described above, as illustrated in FIGS. 1 and 2, the example using the four DACs is explained; however, it is also possible to use a configuration including a single high-speed DAC. In other words, when the signal processing band of a DAC is large enough to cover all of the bands of the odd-order distortions (the center frequencies $f_A$ and $f_B$) and the bands of the even-order distortions (the center frequencies $f_C=2f_A$ and $f_D=f_B-f_A$), the distortion compensation device 10 is able to adopt a configuration in which a DAC is used in common. In such an embodiment, in a digital region, the distortion compensation device 10 digitally up-converts the odd-order distortion compensation signals $y_A(n)$ and $y_B(n)$ corresponding to the center frequencies $f_A$ and $f_B$ and the even-order distortion compensation signals $y_C(n)$ and $y_D(n)$ corresponding to the center frequencies $f_C$ and $f_D$, each to an intermediate frequency. The distortion compensation device 10 combines these distortion compensation signals $y_A(n)$ to $y_D(n)$ together by using a digital signal combiner, subsequently converts the digital signal into an analog signal by employing a DAC used in common, and up-converts the analog signal to a radio frequency by employing an up-converter used in common. With this configuration, it is possible to reduce the quantity (e.g., from four to one) of the DACs being used.

Further, when the bands A and B (the center frequencies $f_A$ and $f_B$) are each at a sufficiently low frequency, while the signal processing band of a DAC is able to cover all of the bands of the odd-order distortions (the center frequencies $f_A$ and $f_B$) and the bands of the even-order distortions (the center frequencies $f_C=2f_A$ and $f_D=f_B-f_A$), the distortion compensation device 10 is able to use the same configuration (where a single DAC is used), even if the DAC is a general-purpose DAC having not so high a speed.

[d] Fourth Modification Example

In the embodiment described above, as illustrated in FIGS. 1 and 3, the example using the four ADCs is explained; however, it is also possible to use a configuration including a single high-speed ADC. In other words, when the signal processing band of an ADC is large enough to cover all of the bands of the odd-order distortions (the center frequencies $f_A$ and $f_B$) and the bands of the even-order distortions (the center frequencies $f_C=2f_A$ and $f_D=f_B-f_A$), the distortion compensation device 10 is able to adopt a configuration in which an ADC is used in common. In such an embodiment, the distortion compensation device 10 down-converts the signals to an intermediate frequency by employing a down-converter used in common, converts the analog signal into a digital signal by employing the ADC used in common and subsequently splits the signal by using a digital signal splitter. In a digital region, the distortion compensation device 10 digitally down-converts the feedback signals $z_A(n)$ and $z_B(n)$ for odd-order distortions corresponding to the center frequencies $f_A$ and $f_B$ and the feedback signals $z_C(n)$ and $z_D(n)$ for even-order distortions corresponding to the center frequencies $f_C$ and $f_D$, each from the intermediate frequency to a baseband and performs a filtering process. With this configuration, it is possible to reduce the quantity (e.g., from four to one) of the ADCs being used.

Further, when the bands A and B (the center frequencies $f_A$ and $f_B$) are each at a sufficiently low frequency, while the signal processing band of the ADC is able to cover all of the bands of the odd-order distortions (the center frequencies $f_A$ and $f_B$) and the bands of the even-order distortions (the center frequencies $f_C=2f_A$ and $f_D=f_B-f_A$), the distortion compensation device 10 is able to use the same configuration (where a single ADC is used), even if the ADC is a general-purpose ADC having not so high a speed.

[e] Fifth Modification Example

Figure 6:
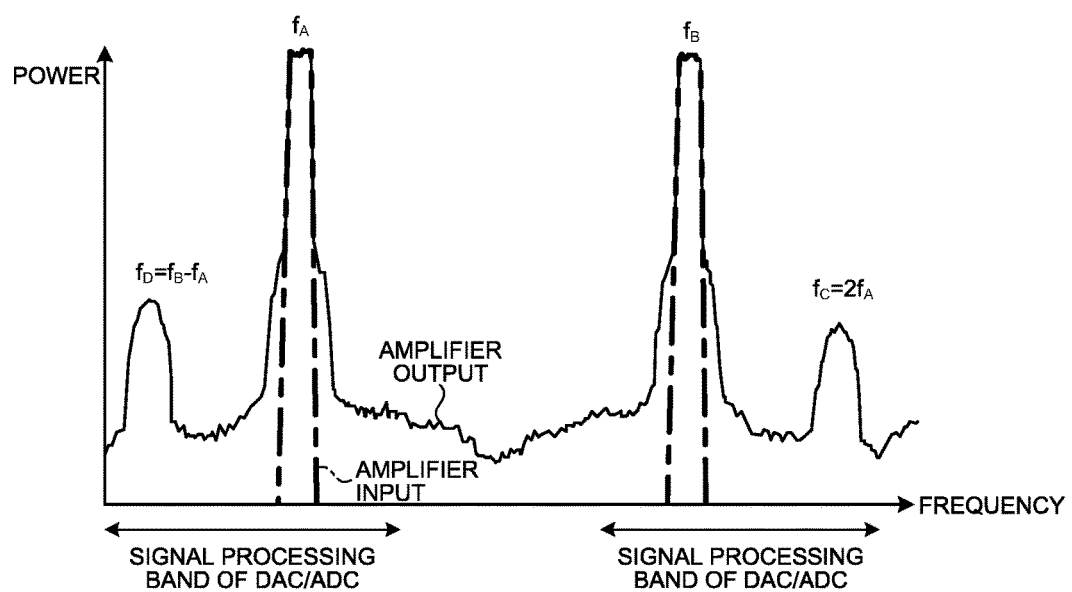
FIG. 6 is a chart illustrating a relationship between a spectrum and signal processing bands of Digital-to-Analog Converters (DACs) and Analog-to-Digital Converters (ADCs) according to a fifth modification example.

It is also possible to adopt the configuration in which DACs and ADCs are used in common, when an even-order distortion occurs in the vicinity of a transmission signal. FIG. 6 is a chart illustrating a relationship between a spectrum and signal processing bands of DACs and ADCs according to a fifth modification example. As illustrated in FIG. 6, when the band A (the center frequency $f_A$) corresponding to an odd-order distortion is close to the center frequency $f_D=f_B-f_A$ corresponding to an even-order distortion, while the signal processing bands of the DACs and the ADCs are able to cover both of these frequency bands, the distortion compensation device 10 may adopt the configuration in which the DACs and the ADCs are used in common. Similarly, as illustrated in FIG. 6, when the band B (the center frequency $f_B$) corresponding to an odd-order distortion is close to the center frequency $f_C=2f_A$ corresponding an even-order distortion, while the signal processing bands of the DACs and the ADCs are able to cover both of these frequency bands, the distortion compensation device 10 may adopt the configuration in which the DACs and the ADCs are used in common.

Figure 7:
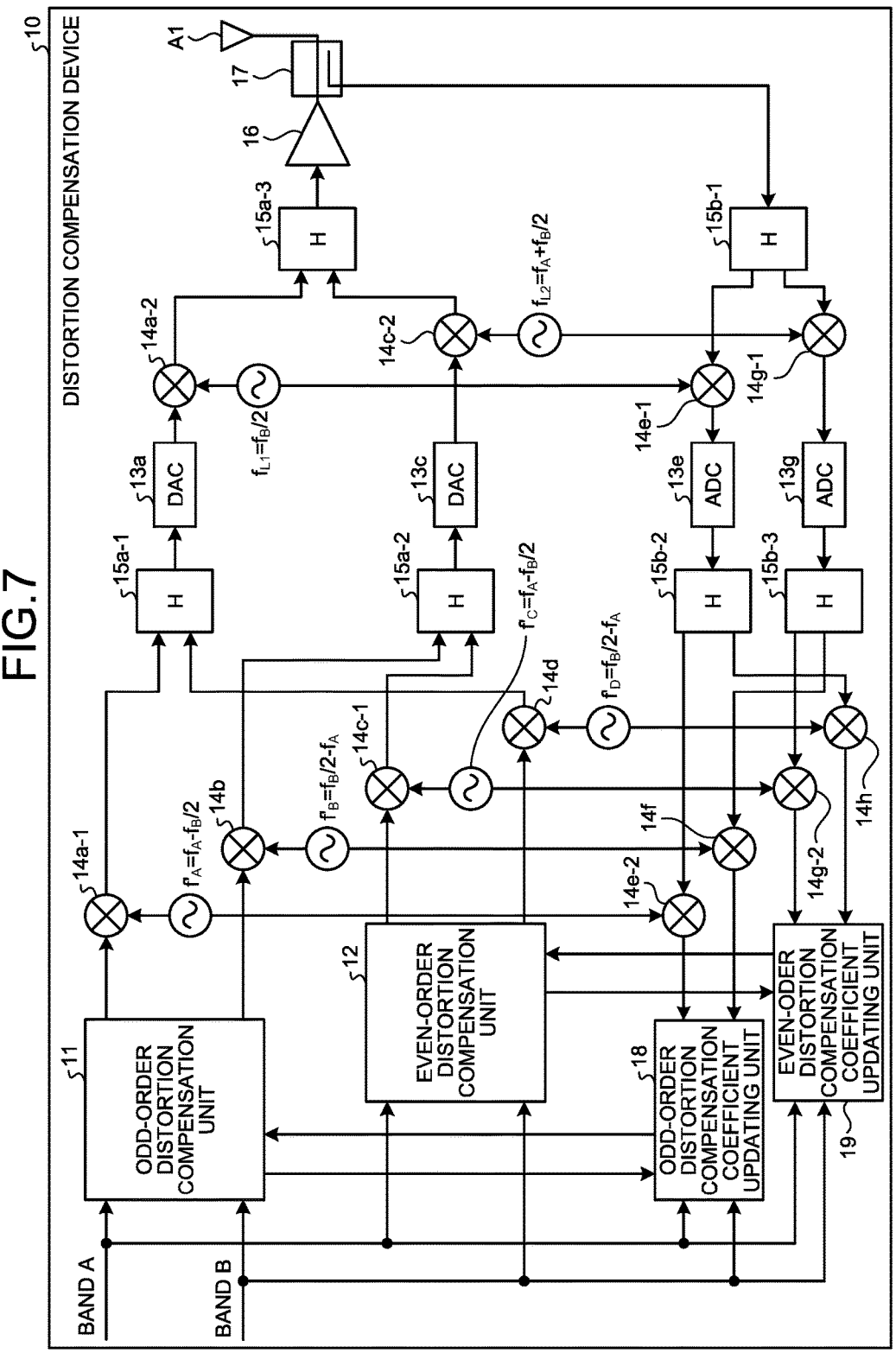
FIG. 7 is a diagram illustrating a configuration of a distortion compensation device according to the fifth modification example.

FIG. 7 is a diagram illustrating a configuration of the distortion compensation device 10 according to the fifth modification example. In FIG. 7, some of the constituent elements that are the same as those in FIG. 1 will be referred to by using the same reference characters, and detailed explanations thereof will be omitted. As illustrated in FIG. 7, in a digital region, the up-converters 14a-1 and 14d convert the frequency of the odd-order distortion compensation signal $y_A(n)$ corresponding to the band A (the center frequency $f_A$) into a frequency $f'_A = f_A - f_B/2$ and convert the frequency of the even-order distortion compensation signal $y_D(n)$ corresponding to the center frequency $f_D$ into a frequency $f'_D = f_B/2 - f_A$, respectively. A signal combiner 15a-1 digitally combines together the distortion compensation signals $y_A(n)$ and $y_D(n)$ resulting from the frequency converting processes. The DAC 13a converts the combined digital signal into an analog signal. An up-converter 14a-2 used in common up-converts the analog signal to a radio frequency by using a local frequency $f_{L1} = f_B/2$.

In a digital region, the up-converters 14b and 14c-1 convert the frequency of the odd-order distortion compensation signal $y_B(n)$ corresponding to the band B (the center frequency $f_B$) into a frequency $f'_B = f_B/2 - f_A$ and convert the frequency of the even-order distortion compensation signal $y_C(n)$ corresponding to the center frequency $f_C$ into a frequency $f'_C = f_A - f_B/2$, respectively. A signal combiner 15a-2 digitally combines together the distortion compensation signals $y_B(n)$ and $y_C(n)$ resulting from the frequency converting processes. The DAC 13c converts the combined digital signal into an analog signal. An up-converter 14c-2 used in common up-converts the analog signal to a radio frequency by using a local frequency $f_{L2} = f_A + f_B/2$. The radio frequency (RF) signals respectively output from the up-converters 14a-2 and 14c-2 are combined by a signal combiner 15a-3 before power-amplified by the amplifier 16.

A signal splitter 15b-1 arranges the feedback signal to be split and be output to two down-converters 14e-1 and 14g-1. The two down-converters 14e-1 and 14g-1 each convert the frequency of the feedback signal input thereto, by using a corresponding one of the local frequencies $f_{L1} = f_B/2$ and $f_{L2} = f_A + f_B/2$. Each of the two ADCs 13e and 13g converts a corresponding one the analog signals of which the frequencies have been converted, into a digital signal. A signal splitter 15b-2 arranges the ADC output signal from the ADC 13e to be split and be output to the down-converters 14e-2 and 14h. The down-converters 14e-2 and 14h each convert the frequency of the feedback signal $z_A(n)$ for the odd-order distortion corresponding to the band A (the center frequency $f_A$) from the frequency $f'_A = f_A - f_B/2$ into a baseband and convert the frequency of the feedback signal $z_D(n)$ for the even-order distortion corresponding to the center frequency $f_C$, from the frequency $f'_D = f_B/2 - f_A$ into a baseband and perform a filtering process, respectively. A signal splitter 15b-3 arranges the ADC output signal from the ADC 13g to be split and be output to the down-converters 14f and 14g-2. The down-converters 14f and 14g-2 each convert the frequency of the feedback signal $z_B(n)$ for the odd-order distortion corresponding to the band B (the center frequency $f_B$) from the frequency $f'_B = f_B/2 - f_A$ to a baseband and convert the frequency of the feedback signal $z_C(n)$ for the even-order distortion corresponding to the center frequency $f_C$ from the frequency $f'_C = f_A - f_B/2$ to a baseband and perform a filtering process, respectively.

By using the distortion compensation device 10 according to the fifth modification example, it is possible to reduce the quantity of component parts used in the analog circuit section.

In the embodiment described above, the example is explained in which the two bands (e.g., 4.6 GHz and 9 GHz) are the frequency bands used for transmitting the signals; however, another arrangement is also acceptable in which a base station or the like including the distortion compensation device 10 transmits signals by using one band or three or more bands. Similarly, the bands in which the even-order distortions are suppressed do not necessarily have to be two bands, and may be one band or three or more bands. Further, the frequency band in which an odd-order distortion occurs and the frequency band in which an even-order distortion occurs do not necessarily have to be bands that are different from each other.

Furthermore, it is not necessary to physically configure the constituent elements of the distortion compensation device 10 as indicated in the drawings. In other words, the specific modes of distribution and integration of the apparatuses and devices are not limited to those illustrated in the drawings. It is acceptable to functionally or physically distribute or integrate all or a part of the apparatuses and devices in any arbitrary units, depending on various loads and the status of use. For example, the odd-order distortion compensation unit 11 and the even-order distortion compensation unit 12 or the odd-order distortion compensation coefficient updating unit 18 and the even-order distortion compensation coefficient updating unit 19 may be integrated together as a single constituent element. On the contrary, the functions of the even-order distortion compensation unit 12 may be distributed to a section that compensates the even-order distribution occurring in a frequency band higher than the transmission band (e.g., $f_C = 2f_A$) and a section that compensates the even-order distribution occurring in a frequency band lower than the transmission band (e.g., $f_D = f_B - f_A$). Further, the memory storing the LUTs or the like therein may be configured as a device provided on the outside of the distortion compensation device 10 so as to be connected via a cable or a network.

Further, in the description above, the individual configurations and operations are explained for each of the embodiments and the modification examples. However, the distortion compensation apparatuses according to any of the embodiments and the modification examples may further include one or more constituent elements that are specific to any other embodiment or modification example. Further, when any of the embodiments and the modification examples are combined together, the combination may be made in an arbitrary form such as a combination of two examples or a combination of three or more examples. For example, the power-series-type distortion compensation method according to the first modification example may be applied to the configuration using the high-speed DAC according to the third modification example. Further, the DACs and the ADCs according to the fifth modification example may be applied to the configuration using the mixer according to the second modification example. Furthermore, a single distortion compensation device 10 may include all the constituent elements described in the embodiment and the first to the fifth modification examples.

By using the distortion compensation device according to at least one aspect of the present disclosure, it is possible to enhance the distortion compensation capability.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device comprising:
an odd-order distortion compensation unit that compensates an odd-order distortion occurring at first frequencies used for transmitting an amplified signal, the first frequencies including a plurality of frequencies; and
an even-order distortion compensation unit that compensates an even-order distortion occurring at second frequencies different from the first frequencies due to amplification of the signal, the second frequencies including one or more frequencies,
wherein the distortion compensation device amplifies multi-band signals in a plurality of frequency bands by employing an amplifier,
wherein the odd-order distortion compensation unit generates a signal resulting from an odd-order distortion compensation process by using, for the first frequencies a transmission signal at a corresponding frequency and an odd-order distortion compensation coefficient for the corresponding frequency,
wherein the even-order distortion compensation unit generates a signal resulting from an even-order distortion compensation process by using for the second frequencies, a transmission signal at one of the first frequencies and an even-order distortion compensation coefficient for the second frequencies,
wherein when the one of the second frequencies is twice as high as the one of the first frequencies, the even-order distortion compensation unit generates the signal resulting from the even-order distortion compensation process by using a value obtained by squaring a transmission signal at the one of the first frequencies and the even-order distortion compensation coefficient for the one of the second frequencies, and
wherein when the one of the second frequencies is equal to a difference between the plurality of frequencies included in the first frequencies, the even-order distortion compensation unit generates the signal resulting from the even-order distortion compensation process by using a complex conjugate of the transmission signal at the one of the first frequencies, the transmission signal at the one of the first frequencies, and the even-order distortion compensation coefficient for the second frequencies.

2. The distortion compensation device according to claim 1, further including:
an odd-order updating unit that updates the odd-order distortion compensation coefficient by using, for the first frequencies, an error signal indicating a difference between a transmission signal at a corresponding frequency and a feedback signal and a complex conjugate of a transmission signal at the corresponding frequency; and
an even-order updating unit that updates the even-order distortion compensation coefficient by using, for the second frequencies, an error signal indicating a difference between a zero signal and a feedback signal and a complex conjugate of a signal being a source of an even-order distortion at a corresponding frequency.

3. A distortion compensation method comprising:
first compensating an odd-order distortion occurring at first frequencies used for transmitting an amplified signal, the first frequencies including a plurality of frequencies;
second compensating an even-order distortion occurring at second frequencies different from the first frequencies due to the amplification of the signal, the second frequencies including one or more frequencies; and
amplifying multi-band signals in a plurality of frequency bands by employing an amplifier,
wherein the first compensating includes generating a signal resulting from an odd-order distortion compensation process by using, for the first frequencies, a transmission signal at a corresponding frequency and an odd-order distortion compensation coefficient for the corresponding frequency,
wherein the second compensating includes generating a signal resulting from an even-order distortion compensation process by using, for the second frequencies, a transmission signal at one of the first frequencies and an even-order distortion compensation coefficient for the second frequencies,
wherein when the one of the second frequencies is twice as high as the one of the first frequencies, the second compensation includes generating the signal resulting from the even-order distortion compensation process by using a value obtained by squaring a transmission signal at the one of the first frequencies and the even-order distortion compensation coefficient for the one of the second frequencies, and
wherein when the one of the second frequencies is equal to a difference between the plurality of frequencies included in the first frequencies, the second compensating includes generating the signal resulting from the even-order distortion compensation process by using a complex conjugate of the transmission signal at the one of the first frequencies the transmission signal at the one of the first frequencies, and the even-order distortion compensation coefficient for the second frequencies.

* * * * *